United States Patent [19]

Israel

[11] Patent Number: 4,752,637

[45] Date of Patent: Jun. 21, 1988

[54] BINDER COMPOSITION FOR MANUFACTURE OF FIBERBOARD

[75] Inventor: Michael G. Israel, St. Petersburg, Fla.

[73] Assignee: Jim Walter Research Corp., St. Petersburg, Fla.

[21] Appl. No.: 895,625

[22] Filed: Aug. 11, 1986

Related U.S. Application Data

[62] Division of Ser. No. 641,089, Aug. 15, 1984, Pat. No. 4,609,513.

[51] Int. Cl.$^4$ .................. C08L 97/02; C08L 75/06; C08L 1/02
[52] U.S. Cl. .................. 524/702; 524/733; 524/871; 524/875; 528/74.5
[58] Field of Search ............... 527/103; 524/702, 871, 524/875, 14, 733

[56] References Cited

U.S. PATENT DOCUMENTS

| | | | |
|---|---|---|---|
| 2,998,399 | 8/1961 | Petropoulos | 260/22 |
| 3,021,290 | 2/1962 | Gmitter et al. | 260/2.5 |
| 3,031,422 | 4/1962 | Posnansky | 260/23 |
| 3,068,254 | 12/1962 | Le Bras et al. | 260/407 |
| 3,267,080 | 8/1966 | Kamal | 260/77.5 |
| 3,505,250 | 4/1970 | Saunders | 260/2.5 |
| 3,578,612 | 5/1971 | Burba et al. | 260/2.5 |
| 3,637,539 | 1/1972 | Wolff et al. | 260/2.5 |
| 3,637,540 | 1/1972 | Wolff et al. | 260/2.5 AM |
| 3,822,226 | 7/1974 | Taft et al. | 260/18 TN |
| 3,890,255 | 6/1975 | van Leuwen et al. | 260/2.5 AQ |
| 3,897,377 | 7/1975 | Broecker et al. | 260/18 TN |
| 3,996,172 | 12/1976 | Olstowski et al. | 260/18 TN |
| 4,049,716 | 9/1977 | Collet | 260/573 |
| 4,100,328 | 7/1978 | Gallagher | 428/407 |
| 4,143,014 | 3/1979 | McLaughlin et al. | 260/29.2 TN |
| 4,218,543 | 8/1980 | Weber et al. | 521/51 |
| 4,257,996 | 3/1981 | Farrissey | 524/35 |
| 4,268,426 | 5/1981 | Williams et al. | 260/22 TN |
| 4,282,330 | 8/1981 | Austin | 521/118 |
| 4,376,088 | 3/1983 | Prather | 264/109 |
| 4,378,441 | 3/1983 | Blount | 521/154 |
| 4,431,455 | 2/1984 | Brown et al. | 106/245 |
| 4,451,425 | 5/1984 | Meyer | 264/300 |
| 4,490,514 | 12/1984 | Fuzesi et al. | 527/401 |
| 4,490,517 | 12/1984 | Fuzesi | 524/14 |
| 4,490,518 | 12/1984 | Fuzesi et al. | 527/401 |
| 4,498,929 | 2/1985 | Robertson | 106/38.2 |
| 4,535,142 | 8/1985 | Brauer et al. | 528/75 |

FOREIGN PATENT DOCUMENTS

60766 7/1973 Australia .

OTHER PUBLICATIONS

*Merck Index*, 9th ed., pp. 242, 711, 712, 1171; Merck & Co., Rahway, N.J., 1976.
Wilson, J. B., "Isocyanate Adhesives as Binders for Composition Board", Adhesives Age, pp. 41-44, May 1981.
Gallagher, J. A., "Urethane bonded particleboard", Forest Products Journal, vol. 32, No. 4, pp. 26-33, Apr. 1982.

*Primary Examiner*—C. Warren Ivy
*Attorney, Agent, or Firm*—James W. Grace; Charles W. Vanecek

[57] ABSTRACT

A binder for use in the preparation of a synthetic board from cellulosic and/or lignocellulosic material comprising an organic polyisocyanate and a mixture of reactive hydrogen-containing compounds having an average of more than one reactive hydrogen atom per molecule, the mixture containing an ester and/or an amide having a hydrocarbon content sufficient to bring about enhanced board release in the board-forming process and to contribute to superior moisture resistance in the finished board.

22 Claims, 1 Drawing Sheet

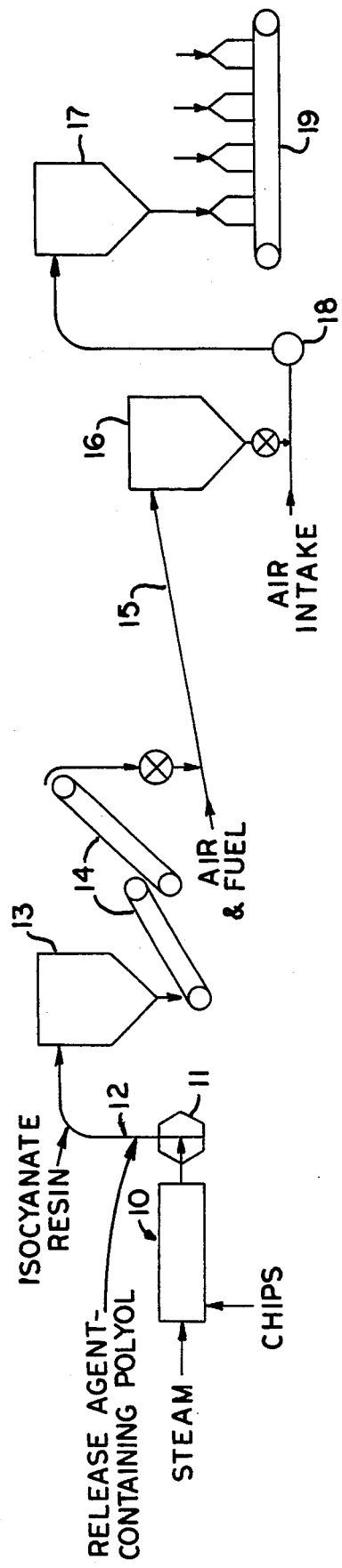

BINDER COMPOSITION FOR MANUFACTURE OF FIBERBOARD

This is a division of application Ser. No. 641,089, filed Aug. 15, 1984, now U.S. Pat. No. 4,609,513.

BACKGROUND OF THE INVENTION

1. Field of the Invention

This invention relates to an improved process for bonding cellulosic and/or ligno-cellulosic materials in the production of synthetic board products by utilizing an internal release agent-containing polyol/polyisocyanate binder.

2. Description of the Prior Art

Many board products are manufactured by the basic process of consolidating or joining together bodies of cellulosic and/or ligno-cellulosic materials or furnish using pressure, heat and a chemical binder. Typical binders used in making such products are thermosetting resins such as phenol-formaldehyde, resorcinol-formaldehyde, melamine-formaldehyde, urea-formaldehyde, urea-furfural and condensed furfuryl alcohol resins. Another binder system, which has been gaining favor in recent years, involves the use of organic polyisocyanates, either alone or in combination with other binder materials, such as urea-or melamine-formaldehyde resins, phenol-formaldehyde resins, etc.

The use of polyisocyanate binders in the production of board products is subject to the drawbacks that the isocyanates generally are more expensive than the commonly used formaldehyde binder systems, and the boards produced with the isocyanates have a tendency to adhere to the face of the platens used in their formation. This adhesion can damage or even ruin the board product, and the subsequent cleanup of the contaminated platens is difficult, timeconsuming and costly.

Various attempts have been made to overcome this adhesion problem. Conventional release agents such as oils, wax polishes, silicones and polytetrafluoroethylene have been tried and found wanting. U.S. Pat. No. 4,100,328 discloses the use of a polyether polyol-organic polyisocyanate binder composition for bonding cellulosic materials and eliminating sticking to mold faces. Unfortunately, in this binder composition a portion of the rather costly isocyanate component is replaced by polyols which themselves are relatively expensive materials. It accordingly would be highly desirable if a binder system for board products could be prepared by combining an isocyanate with a relatively inexpensive diluent which significantly reduces the overall cost of the system but still contributes to the obtainment of desirable board properties, including superior strength, moisture resistance and release.

OBJECTS OF THE INVENTION

It is an object of the present invention to provide an improved binder system for use in producing a synthetic board from ligno-cellulosic and/or cellulosic materials.

It is a further object of the present invention to provide a simple and economical process for producing a synthetic board product through the use of the improved binder system of the invention, which exhibits superior adhesive characteristics in the board and is particularly effective in minimizing unwanted adhesion to the platens used in producing the board.

It is a still further object of the present invention to provide a synthetic board product, especially a medium or high density fiberboard product, which has a combination of excellent properties, including superior strength and moisture resistance.

It is another object of the present invention to provide a synthetic board product which has a superior combination of properties making it especially suitable for interior applications.

These and other objects and advantages of the present invention will become more apparent to those skilled in the art when the instant disclosure is read in conjunction with the accompanying drawing.

SUMMARY OF THE INVENTION

The above objects have been achieved in the process of the present invention for forming fiberboard between metal platens utilizing a binder comprising a combination of a polyisocyanate, a reactive hydrogen-containing component, and a sizing agent having board release and surface active properties and also preferably containing at least one reactive hydrogen. The sizing agent or "functional wax" of the invention brings about a minimization of sticking between the board and platen surfaces during the forming process and production of board products with highly attractive properties, and is also believed to aid in the effective distribution of binder in the board-forming composite. The binder system can be used in the production of both interior and exterior grade board products.

The polyisocyanate of the binder system may suitably be any organic polyisocyanate compound containing at least 2 active isocyanate groups per molecule, or mixtures of such compounds. Polyphenyl polyisocyanates, such as diphenylmethane-4,4'-diisocyanate and polymethylene polyphenyl polyisocyanates, are particularly suitable.

Employed in conjunction with the polyisocyanate is a reactive hydrogen-containing component, preferably a polyol. Polyols are well known materials employed in making polyurethanes and polyisocyanurates, and a wide variety of polyols may be used in the present invention. Preferred polyols are polyether and polyester polyols.

The binder system of the invention also must contain sufficient surface active sizing agent to permit consolidation of cellulosic particles into a fiberboard with substantially reduced adhesion to metal mold parts and improved moisture resistance as compared to a similar use of prior art binders comprising an organic polyisocyanate. Because use of the sizing agent in the isocyanate binder system of the invention leads to highly moisture resistant boards, the agent serves as a replacement for the conventional paraffin wax sizing used as water repellent. The sizing agent preferably contains at least one reactive hydrogen so that it too possesses functionality for reaction with the polyisocyanate component. Additionally, the sizing agent suitably has a high hydrocarbon content preferably derived from a fatty acid, and hence the agent can be termed a "functional wax." Especially preferred sizing agents are hydroxy-terminated glycol esters of mono- and dibasic acids.

The total reactive hydrogen-containing ingredients of the present binder system, including, for example, hydroxyl group-containing molecules both with and without surface active sizing capability, generally have hydroxyl numbers ranging from about 100 to 700, preferably from about 100 to 400, and have a functionality of from about 1 to 8, more preferably from about 1 to 2, and most preferably about 2.

DESCRIPTION OF THE DRAWING

The invention will now be described with reference to the accompanying drawing which is a diagrammatic representation of a preferred method for utilizing the binder system of the present invention in a synthetic board-making process.

DETAILED DESCRIPTION OF THE INVENTION

The method of the present invention is suitable for processing cellulosic starting materials in general, and is particularly useful for forming wood particles into board products. Mixtures of cellulosic particles may be used. Typically, such materials are wood particles derived from lumber manufacturing waste such as planar shavings, veneer chips, and the like. Particles of other cellulosic material such as shredded paper, pulp or vegetable fibers such as corn stalks, straw, bagasse and the like, and of non-cellulosic materials such as shredded scrap rubber, polyurethane, polyisocyanurate and like cellular and non-cellular polymers can also be used. Inorganic materials such as hydrated alumina, gypsum, chopped mineral fibers and the like can also be employed, either alone or in combination with any of the above cellulosic or non-cellulosic materials, in the formation of boards in accordance with the present invention. By way of illustration, the invention will be described hereinafter particularly with respect to the manufacture of fiberboard.

The fiberboard is produced according to the process of the invention by bonding together particles of wood or other cellulosic material using heat, pressure and the binder system of the invention. The process of the invention particularly relates to the preparation of a synthetic board wherein cellulosic material is contacted with a binder and the treated material is subsequently formed into boards by the application of heat and pressure, the improvement wherein the binder comprises an organic polyisocyanate and a mixture of reactive hydrogen-containing compounds containing an average of more than one reactive hydrogen atom per molecule, said mixture containing a member selected from the group consisting of (a) an ester, (b) an amide and (c) mixtures thereof having a hydrocarbon content sufficient to bring about enhanced board release in the board-forming process.

As mentioned above, the binder system may suitably contain any organic polyisocyanate containing two or more isocyanate groups. The polyisocyanates which may be employed include the aliphatic, cycloaliphatic and aromatic polyisocyanates, and combinations thereof. Representative of these types are the following: m- and p-phenylene diisocyanates, toluene-2,4-and 2,6-diisocyanates, diphenylmethane-4, 4-diisocyanate, 4-chloro-1, 3-phenylene diisocyanate, napthalene-1,5-diisocyanate, diphenylene-4,4-diisocyanate, 3,3'-dimethyl diphenylmethane-4,4'-diisocyanate, 3-methyldiphenylmethane-4,4'-diisocyanate, diphenylether diisocyanate, cyclohexane-2,4- and 2,3-diisocyanates, 1-methyl cyclohexyl-2,4- and 2,6-diisocyanates, bis-(isocyanatocyclohexyl-) methane, 2,4,6-triisocyanatotoluene, 2,4,4-tri-isocyanatodiphenyl ether, polymethylene polyphenyl polyisocyanates, methylene diphenyl diisocyanate, triphenylmethane triisocyanate, 3,3'-ditolylene-4,4-diisocyanate, 4,4'-methylenebis (2-methyl-phenyl isocyanate), hexamethylene diisocyanate, and cyclohexylene-1,3-and 1,2-diisocyanates. Preferred polyisocyanates are polymethylene polyphenyl polyisocyanates.

Any suitable organic compound having at least two reactive hydrogens as determined by the Zerewitinoff method may be used in the binder system of the invention. The organic compound having at least two reactive hydrogens may be a polyhydric polyether, such as a polyhydric polyalkylene ether prepared by condensation of an alkylene oxide, such as, for example, ethylene oxide, propylene oxide, butylene oxide, amylene oxide or the like, or epichlorohydrin alone or together with a polyhydric alcohol, such as ethylene glycol, propylene glycol, butylene glycol, trimethylol propane, glycerine, pentaerythritol, sorbitol, hexanetriol or the like. The polyhydric polyether might also contain phenylene radicals, such as one prepared by condensation of styrene oxide or by condensation of other suitable aromatic compounds. The alkylene oxides may also be condensed with sugar, phenols, such as, for example, hydroquinone, or 4,4'-dihydroxy diphenylmethane, or they may be condensed with ammonia or a suitable amine, such as, for example, ethylene diamine, hexamethylene diamine, aniline, phenylene diamine or the like to produce a polyether suitable for use in accordance with this invention. Polyethers prepared by condensation of ethylene oxide, trimethylene oxide or by polymerization of tetrahydrofuran and containing primary hydroxyl groups and their adducts may also be used. Polythioethers prepared by condensation of a thioglycol, such as thiodiglycol, or by condensation of thiodiglycol with a suitable polyhydric alcohol, such as, for example, ethylene glycol, trimethylol propane, glycerine, pentaerythritol or the like, may be used. In a preferred embodiment of the invention, the polyether polyol is used to esterify the fatty acid and advantageously comprises a diol having a low equivalent weight generally between about 53 and 102. Examples of suitable diols include, among others, diethylene glycol, dipropylene glycol, triethylene glycol, tripropylene glycol and tetraethylene glycol, preferably diethylene glycol, dipropylene glycol and/or tripropylene glycol. Polyacetals prepared by reaction of a polyhydric alcohol, such as, for example, one of those listed above and formaldehyde, may be used.

Other examples of suitable organic compounds including reactive hydrogens are polyesters prepared by condensation of a suitable polycarboxylic acid with a suitable polyhydric alcohol. The polycarboxylic acid may be an aliphatic compound, such as, for example, adipic acid, succinic acid, sebacic acid, dimer and trimer fatty acids, maleic acid or the like. It may be a suitable aromatic compound, such as, for example, phthalic anhydride; terephthalic acid, or the like. Any suitable polyhydric alcohol may be used in preparing the polyester, such as, for example, ethylene glycol, propylene glycol, trimethylol propane, diethylene glycol or other suitable polyalkylene glycols including polybutylene glycols or the like. The polycarboxylic acid may also be condensed with a suitable amino alcohol, such as, for example, monoethanolamine, diethanolamine, triethanolamine, or the like. Moreover, the polycarboxylic acid may be condensed with a mixture of polyhydric alcohols and amino alcohols. If desired, a mixture of organic compounds having reactive hydrogens may be used. Where appropriate, the aforementioned polyols may be prepared in the presence of fatty acids to produce the internal release or sizing agent-containing polyols of the present invention.

Particularly suitable polyols of the binder system are aromatic polyester polyols. These polyols advantageously contain at least two hydroxyl groups and generally have a molecular weight of from about 150 to 5,000. Preferably, the polyesters contain from 2 to 8 hydroxyl groups and have a molecular weight of from about 220 to 800, more preferably from about 270 to 400. The acid component of these polyesters comprises at least 40% by weight of phthalic acid residues. By phthalic acid residue is meant the group

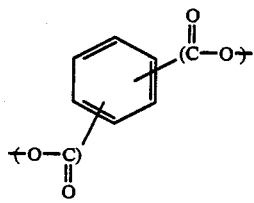

Particularly suitable compositions containing phthalic acid residues for use in the invention are (a) estercontaining high boiling by-products from the manufacture of dimethyl terephthalate and (b) polyalkylene terephthalates.

These polyesters include, for example, reaction products of polyhydric, preferably dihydric and optionally trihydric, alcohols with phthalic acids and other polybasic, preferably dibasic, carboxylic acids. Instead of using the free phthalic acids or polycarboxylic acids, the corresponding acid anhydrides or corresponding acid esters of lower alcohols or mixtures thereof may be used for preparing the polyesters. O-phthalic acids, isophthalic acids and/or terephthalic acids may be used as the phthalic acid. The optional polybasic-carboxylic acids may be aliphatic, cycloaliphatic, aromatic and/or heterocyclic and may be substituted, for example, with halogen atoms and/or may be unsaturated. The following are mentioned as examples: succinic acid, adipic acid, suberic acid, azelaic acid, sebacic acid, trimellitic acid, tetrahydrophthalic acid anhydride, hexahydrophthalic acid anhydride, endomethylene tetrahydro phthalic acid anhydride, glutaric acid anhydride, maleic acid, maleic acid anhydride, fumaric acid, dimeric and trimeric fatty acids, optionally mixed with monomeric fatty acids. Suitable polyhydric alcohols include, for example, ethylene glycol, propylene glycol-(1,2) and -(1,3), octane diol-(1,8), neopentyl glycol, cyclohexane dimethanol, (1,4-bis-hydroxymethylcyclohexane), 2-methyl-1,3-propane diol, glycerol, trimethylolpropane, hexanetriol-(1,2,6), butane triol-(1,2,4), trimethylolethane, pentaerythritol, quinitol, mannitol and sorbitol, methylglycoside, diethylene glycol, triethylene glycol, tetraethylene glycol, polyethylene glycols, dipropylene glycol, polypropylene glycols, dibutylene glycol, and polybutylene glycols.

A preferred hydroxy terminated aromatic polyester for use in the present invention is prepared by the transesterification, with a glycol of molecular weight from about 60 to about 400, of a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids. This residue is described in U.S. Pat. No. 3,647,759, the disclosure of which is hereby incorporated by reference. Two preferred transesterifying glycols which can be reacted with the residue are ethylene glycol and diethylene glycol, with the latter being more preferred. Examples of transesterified residues which can be used in accordance with the invention are those supplied by Hercules, Inc., Wilmington, Del. under the trade name of Terate resins.

An excess of the transesterifying glycol advantageously may be used to react with the residue defined above. However, where volatilization of excess transesterifying glycol can cause a problem in subsequent processing, this excess can be reacted to form part of the surface active sizing agent of the invention, as will be explained below.

The properties of the above transesterified polyol mixtures which can be employed in accordance with the present invention fall within rather broad ranges. The polyol mixtures are described in U.S. Pat. No. 4,237,238, the disclosure of which is hereby incorporated by reference. A preferred polyol mixture is characterized by a viscosity in cps at 25° C. of about 1,600 to about 2,800, a free diethylene glycol content of from about 20 to about 30 percent by weight of said mixture, a hydroxyl number within a range of from about 400 to about 490, and an acid number of about 0.2 to about 8.

Another preferred aromatic polyester polyol which can be employed is prepared by the transesterification, with a glycol of molecular weight from about 60 to 400, of a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials. An expecially useful polyol mixture can be prepared by transesterifying a by-product fraction from the manufacture of dimethyl terephthalate comprising a mixture of:

(a) about 40 to 60 percent by weight of dimethyl terephthalate,
(b) about 1 to 10 percent by weight of monomethyl terephthalate,
(c) about 1 to 2 percent by weight of terephthalic acid,
(d) about 10 to 25 percent by weight of bi-ring esters,
(e) about 5 to 12 percent by weight of organic acid salts,
(f) about 18 to 25 percent by weight of polymeric materials, and
(g) about 1 to 4 percent by weight of ash.

An excess of the transesterifying glycol is advantageously used to react with the by-product fraction. Two preferred glycols for transesterifying the by-product fraction are ethylene glycol and diethylene glycol, with the latter being more preferred. As mentioned above, excess transesterifying glycol can be reacted to become part of the sizing agent when necessary. An example of a transesterified by-product fraction of the invention is the product supplied by Jim Walter Resources, Inc. under the trade designation Foamol 250.

The properties of the polyol mixture produced by transesterifying the by-product fraction defined above are described in U.S. Pat. No. 4,411,949, the disclosure of which is hereby incorporated by reference. A preferred polyol mixture is characterized by a viscosity in cps at 25° C. of about 700 to about 2500, a free diethylene glycol content of from about 10 to about 30 percent by weight of said mixture, a hydroxyl number within a range of from about 350 to about 468, and an acid number of about 0.2 to about 10.

Other desirable aromatic polyester polyols for use in the present invention are prepared by the depolymerization or transesterification of polyalkylene terephthalate with a polyol, such as those described in U.S. applications Ser. Nos. 372,904, filed Apr. 29, 1982, now U.S. Pat. No. 4,711,912, and 582,348 filed Feb. 22, 1984, now U.S. Pat. No. 4,539,341, the disclosures of which applications are hereby incorporated by reference.

The sizing or release agent of the present binder system contributes to good board release properties during production and excellent physical properties in the finished fiberboard, including superior moisture resistance. This agent suitably has a high hydrocarbon content and is generally formed by reaction of a compound having such content, such as a fatty acid, with a compound which has at least two reactive hydrogens and may itself have a high hydrocarbon content. Additionally, the manufactured sizing agent advantageously contains at least one reactive hydrogen, and preferably two reactive hydrogens, so that the agent is capable of chain extension in the board-forming process of the invention. Examples of active hydrogencontaining compounds which can be reacted with fatty acids in the preparation of sizing agents of the invention are amines and alcohols. Preferred sizing agents are derived from alcohols which are reacted with aliphatic mono-and/or dicarboxylic acids to yield fully and/or partially esterified products. Highly suitable esters are derived from polyhydric alcohols, preferably diols, and saturated or unsaturated fatty acids containing from about 10 to 54 carbon atoms. The polyols are suitably of low equivalent weight generally between about 31 and 102. Examples of suitable polyhydric alcohols are ethylene glycol, propylene glycol, trimethylene glycol, glycerin, trimethylolpropane, pentaerythritol, 2-methyl-1,3-propanediol, diethylene glycol, triethylene glycol, tetraethylene glycol, polyethylene glycols, dipropylene glycol, polypropylene glycols, dibutylene glycol, and polybutylene glycols. Suitable fatty acids include palmitic acid, stearic acid, oleic acid, linoleic acid, linolenic acid, palmitoleic acid, eleostearic acid, licanic acid, arachidonic acid, ricinoleic acid, dimeric and trimeric fatty acids, and the like. The fatty acids may be saturated or unsaturated and preferably do not contain hydroxyl groups. Also useful are the mixtures of hydroxy terminated esters derived from natural resources such as castor oil, cottonseed oil, linseed oil, olive oil, safflower oil, sardine oil, tallow, tung oil, tall oil, soybean oil, sunflower oil, and the like.

The reactive hydrogen-containing compound (polyol) and release agent or more specifically, fatty acid ester, of the binder system may be prepared individually according to conventional procedures, and thereafter applied to the wood particles in any suitable manner. The polyisocyanate is suitably applied to the wood separately from the foregoing components. For example, the polyol and fatty acid ester can be separately prepared and subsequently mixed together at such a temperature that the components are in a suitable liquid state and then applied to the fibrous material in the board forming process. However, in another embodiment the ester release agent is produced in the presence of the polyol or of ingredients being reacted to form the polyol, and the resultant reaction product is applied separately from the polyisocyanate. Thus, for example, the by-product fraction from dimethyl terephthalate production disclosed in U.S. Pat. No. 4,411,949 can be heated with a transesterifying glycol such as diethylene and/or dipropylene glycol in the presence of a fatty acid or mixture of fatty acids to form a fatty acid ester-containing polyol mixture of the present invention. Sufficient glycol is included in the reaction mixture to both transesterify the by-product fraction and esterify the fatty acid(s). Both fatty acid half-esters and di-esters are produced. Of the total ingredients yielding the release agent-containing polyol mixture, the fatty acid generally comprises about 5 to 95 weight percent, preferably about 30 to 70 weight percent, and more preferably about 50 to 70 weight percent.

The properties of the preferred ester release agent-containing polyol component of the present invention fall within rather broad ranges because of the variable nature of the materials employed in forming the polyol, such as the by-product residue of U.S. Pat. No. 3,647,759 and the polyalkylene terephthalate scrap of U.S. application Ser. No. 372,904. Accordingly, this polyol component ranges in form from a low viscosity oil to a solid at ambient temperature, and its hydroxyl number falls within a range of from about 100 to about 700, preferably from about 150 to about 250, and the acid number falls within a range of from about 0.2 to about 20 and preferably from about 0.2 to about 10.

A most preferred polyol mixture of the invention comprises the reaction product from transesterification of an ester-containing by-product of dimethyl terephthalate manufacture and/or scrap polyalkylene terephthalate, as disclosed above, with a glycol of molecular weight from about 60 to 500, such as diethylene glycol, dipropylene glycol and/or tripropylene glycol, and (a) concurrent esterification of a fatty acid or mixture of fatty acids, such as palmitic acid, stearic acid, oleic acid and mixtures thereof, with the same or different glycol(s), or (b) blending of the transesterification product with a separately produced esterification product of the fatty acid or mixture of fatty acids with the same or different glycol(s). Mixtures of the two-step blend with the one-step reaction product are also within the scope of the invention. This ester-containing polyol mixture is characterized by a hydroxyl number within a range of from about 150 to about 200, and an acid number of from about 0.2 to about 10.

In the binder composition of the invention, the equivalent ratio of polyisocyanate to polyol is generally about 10:1 to 2:1 and preferably 8:1 to 3:1. The quantity of binder needed in a particular board-forming process can be determined by simple experimentation. An application of from about 0.5 to 8%, preferably 3 to 6% for fiberboard and 1.5 to 4% for waferboard and particleboard, of total binder composition, solids basis, is generally employed.

The process of the invention is readily carried out by applying the organic polyisocyanate and the release agent-containing polyol separately to the wood particles in any suitable manner, such as by spraying, and then subjecting the treated material to heat and pressure. The binder composition of the invention is suitably applied to moist wood particles which are generally at a moisture content of about 3–60%, based on the dry weight of the wood particles. The polyol component may be applied before or after the polyisocyanate. Although the polyol and polyisocyanate components may be applied in the form of a solution or dispersion, the components preferably are applied neat. If desired, other conventional binding agents, such as formaldehyde condensation polymers, may be used in conjunction with the polyisocyanate. Conventional additives, such as water-repellents, may be used.

A preferred method of manufacturing fiberboard in accordance with the invention is disclosed in U.S. Pat. No. 4,407,771, the disclosure of which is hereby incorporated by reference. Referring to the drawing, raw wood chips are presteamed in digester 10. The cooked chips which emerge from the digester are blown through a refiner 11 operated under steam pressure. After refining, the stock and steam are conveyed through blow line 12 to refiner cyclone 13, where the steam and fiber are separated.

The release agent-containing polyol and isocyanate resin are separately added to the blow line and mix with the hot fiber emerging from the refiner. The treated fiber is then blown through cyclone 13 and is carried by belt conveyors 14 to a direct fired, dryer tube 15, which reduces moisture to about 5 to 16%. The fiber remains in the dryer for about 2 or 3 seconds, and thereafter is conveyed through pollution control cyclones 16 and 17, with blower fan 18 providing an air stream to convey the fibers from cyclone 16 to and through cyclone 17. The fibers entrained in the air stream are discharged from cyclone 17 and deposited on felters 19 to be formed into mats. Both the mat and subsequent board formation are accomplished in a conventional manner. During the pressing operation the mats are generally heated to a temperature of about 250°–450° F. as they are being compressed at about 100–600 psi. Pressing times are typically about 2–10 minutes. A release agent, such as, for example, silicone, glycerin or wax emulsion, can be applied on the press plates to further minimize sticking. After pressing, the boards are prepared for the marketplace in a conventional manner.

In an alternative to the above procedure, the release agent-containing polyol and isocyanate resin can be applied to the wood fibers in a suitably located blender rather than in the blow line out of the refiner. In another embodiment, the release agent-containing polyol can be added from an existing wax delivery system, such as from such a system into digester 10.

The invention is further illustrated by the following examples in which all parts and percentages are by weight unless otherwise indicated.

EXAMPLE 1

A. Preparation of Binder Polyol 1

A polyol was prepared from the following ingredients in the indicated proportions:

| Ingredients | Quantity (g) |
|---|---|
| Dimethyl terephthalate containing by-product fraction[1] | 49 |
| Diethylene glycol | 208 |
| Fatty acid by-product[2] | 208 |
| Hydrogenated tall oil fatty acid[3] | 192 |
| Tetraisopropyl titanate[4] | 0.8 |

[1] This is a by-product fraction from the manufacture of dimethyl terephthalate, which has a saponification number of ca. 590 and an acid number of ca. 3.5.
[2] This is a commercially obtained product, sold under the trade designation "Cromon D1" by Sylvachem, a Division of SCM Corporation.
[3] This is a commercially obtained product, sold under the trade designation "Emery 400 Stearic Acid" by Emery Industries, Inc.
[4] This is a commercially obtained catalyst, supplied under the trade designation "Tyzor TPT" by E. I. duPont de Nemours Co., Inc.

The above ingredients were charged to a 1-liter, 3-necked, round-bottom flask equipped with a stirrer, thermometer and fractionating column with condenser. The ingredients were heated to 245° C. during a 2-hour period and maintained at that temperature until distillation was complete (ca. 24 ml distillate collected).

The resulting polyol exhibited the following properties:

| | |
|---|---|
| Acid Number: | 2.5 |
| Hydroxyl Number: | 155 |
| % Free Diethylene Glycol: | 6.6 |
| Viscosity @ 25° C., cps | 680 |

B. Preparation of Medium Density Fiberboard

Wood fibers (mixed hardwoods, predominantly oak) were treated sequentially with 0.9 percent of the above Binder Polyol 1 followed by 2.25 percent of Mondur MR, a commercial polymethylene polyphenyl isocyanate available from Mobay Chemical Corporation. The treated furnish was compression molded at about 500 psi pressure and a temperature of about 350° F. between freshly cleaned, untreated stainless steel plattens without any evidence of sticking. The test was terminated after the operation was repeated 40 more times with the fiberboards still releasing without sticking at the end. These release results constituted a greater than two- and fourfold improvement over commercial waterdispersible release-modified and unmodified polymethylene polyphenyl isocyanate binders, respectively. Additionally, the partial replacement of isocyanate by Binder Polyol 1 contributed to a marked improvement in board physical properties. The internal bond and both face and edge screw withdrawal strengths of the inventive binder system exceeded the strengths attained with the commercial isocyanate binders. Satisfactory board moisture resistance was attained without the use of conventional paraffin wax sizing.

EXAMPLE 2

A. Preparation of Binder Polyol 2

A polyol was prepared from the following ingredients in the indicated proportions:

| Ingredients | Quantity (g) |
|---|---|
| Polyester polyol[1] | 210 |
| Oleic acid[2] | 142 |
| Triethanol amine[3] | 75 |

[1] The polyester polyol has a hydroxyl number of 312 and an acid number of 2.3 and is supplied by Jim Walter Resources, Inc. under the trade name Foamol 250.
[2] The oleic acid is a commercially obtained product, sold under the trade designation "Industrene 105" by the Humko Division of Witco Chemical Corporation.
[3] The triethanol amine is a commercially obtained product, sold under the trade designation "Alkanolamine 244" by The Dow Chemical Company.

The oleic acid and triethanol amine were charged to a 500 ml 4-necked, round-bottom flask equipped with a stirrer, thermometer, gas inlet tube and Dean Stark takeoff. The ingredients were stirred under a nitrogen purge at a temperature of 165°–180° C. for 6 hours. Approximately 6 ml of water were recovered. The product, which had an acid number of 2.5 and a hydroxyl number of 378, was blended with the polyester polyol.

Preparation of Medium Density Fiberboard

Wood fibers (mixed hardwoods, predominantly oak) were treated sequentially with 1.5 percent of the above Binder Polyol 2 followed by 4.5 percent of Pappi 135, a commercial polymethylene polyphenyl isocyanate available from The Upjohn Company. The treated furnish was compression molded as described in Example 1 to produce boards whose moisture resistance and other board properties were comparable to those of boards prepared with a commercial phenolformaldehyde or polymethylene polyphenyl isocyanate incorporating conventional paraffin wax fiber sizing. Excellent board release was demonstrated when the above process was performed on a commercial scale by sequential application of the polyol and isocyanate to tne wood fibers in the blow line out of a pressurized refiner and subsequent board formation essentially as described in the Example of U.S. Pat. No. 4,407,771, except that no paraffinic wax was metered onto the wood chips entering the digester. Additionally, the relatively low press temperatures and short cure times required for the boards made with the inventive urethane binders as compared to the conditions required for boards made with phenolic binders eliminated the necessity for the board rehumidification normally required to restore the equilibrium board moisture of phenolic bound boards.

EXAMPLE 3

A. Preparation of Binder Polyol 3

A polyol was prepared from the following ingredients in the indicated proportions:

| Ingredients | Quantity (lb) |
| --- | --- |
| Polyester polyol[1] | 23 |
| Diethylene glycol | 10 |
| Tall oil[2] | 44 |

[1]The polyester polyol has a hydroxyl number of 312 and an acid number of 2.3 and is supplied by Jim Walter Resources, Inc. under the trade name Foamol 250.
[2]The tall oil is a commercially obtained product, sold under the trade designation "Acintol FA-1" by Sylvachem, a Division of SCM Corporation.

The above ingredients were charged to a 50 l glass reactor equipped with an agitator, temperature controller and takeoff head for distillation. The ingredients were heated at approximately 205° C. for 2 hours and 2.7 lb. of distillate were recovered.

The resulting polyol exhibited the following properties:

| Acid Number: | 6.5 |
| --- | --- |
| Hydroxyl Number: | 150 |
| Viscosity @ 25° C., cps | 150 |

B. Preparation of Medium Density Fiberboard

Hot and moist wood fibers (mixed hardwoods, predominantly oak) were treated in the blow line out of a pressurized refiner sequentially with 0.75 percent of the above Binder Polyol 3 followed by 2.25 percent of Mondur MR, a commercial polymethylene polyphenyl isocyanate available from Mobay Chemical Corporation, and subsequent board formation was accomplished essentially as described in the Example of U.S. Pat. No. 4,407,771, except that no paraffinic wax was metered onto the wood chips entering the digester. This partial replacement of isocyanate by Binder Polyol 3 without the application of any paraffinic wax to the wood chips yielded boards with properties superior to those of boards made with commercial waterdispersible release-modified polymethylene polyphenyl isocyanate binders. The isocyanate and Binder Polyol 3 of the invention also were successfully applied to the wood fibers in a blender in the production of fiberboards having excellent physical properties.

EXAMPLE 4

A. Preparation of Binder Polyol 4

A polyol was prepared from the following ingredients in the indicated proportions:

| Ingredients | Quantity (lb) |
| --- | --- |
| dimethyl terephthalate containing by-product fraction[1] | 445 |
| Diethylene glycol | 944 |
| Fatty acid by-product[2] | 944 |
| Hydrogenated tall oil fatty acid[3] | 871 |
| Tetraisopropyl titanate[4] | 3.2 |

[1]This is a by-product fraction from the manufacture of dimethyl terephthalate, which has a saponification number of ca. 590 and an acid number of ca. 3.5.
[2]This is a commercially obtained product, sold under the trade designation "Cromon D1" by Sylvachem, a Division of SCM Corporation.
[3]This is a commercially obtained product, sold under the trade designation "Industrene R" by the Humko Division of Witco Chemical Corporation.
[4]This is a commercially obtained catalyst, supplied under the trade designation "Tyzor TPT" by E. I. duPont de Nemours & Co., Inc.

The above ingredients were charged to a 500 gal. stainless steel reactor equipped with an agitator, temperature controller and fractionating takeoff head with condenser for distillation. The ingredients were heated at a temperature of 175°–235° C. for 3 hours. Approximately 195 lb. of distillate were recovered.

The resulting polyol exhibited the following properties:

| Acid Number: | 1.1 |
| --- | --- |
| Hydroxyl Number: | 161 |
| % Free Diethylene Glycol: | 8.2 |
| Viscosity @ 25° C., cps | 420 |

B. Preparation of Medium Density Fiberboard

Hot and moist wood fibers (mixed hardwoods, predominantly oak) were treated in the blow line out of a pressurized refiner sequentially with an initial application of 0.75 percent of the above Binder Polyol 4 followed by 2.25 percent of Mondur MR, a commercial polymethylene polyphenyl isocyanate available from Mobay Chemical Corporation, and subsequent board formation was accomplished essentially as described in the Example of U.S. Pat. No. 4,407,771, including the preconditioning of the press plates with a release agent but without metering paraffinic wax onto the wood chips entering the digester. During the production run, which was terminated after 72 press releases, the polyol content of the binder system was increased from the initial value of 0.75 percent to 1.13 percent at a constant level (2.25%) of the isocyanate. This increase in polyol usage ensured good board release throughout the run and also enhanced the board's moisture resistance and finishing properties, with the maintenance of other important physical properties.

I claim:

1. A synthetic board comprising cellulosic material bonded together with a binder comprising an organic polyisocyanate and a mixture of reactive hydrogen-containing compounds containing an average of more than one reactive hydrogen atom per molecule, said mixture comprising a member selected from the group consisting of (a) a blend of (i) an aromatic polyester polyol and (ii) a reaction product of at least one fatty acid and at least one polyol, (b) a reaction product of at least one polyol and at least two coreactants selected from the group consisting of carboxylic acids, carboxylic acid anhydrides, carboxylic acid esters and mixtures thereof, the coreactants including at least one fatty acid and at least one aromatic compound selected from the group consisting of o-phthalic acids, isophthalic acids and terephthalic acids or the corresponding acid anhydrides or acid esters, and (c) mixtures thereof, wherein each fatty acid contains from 10 to 54 carbon atoms.

2. The synthetic board of claim 1 wherein said polyisocyanate is a polymethylene polyphenyl polyisocyanate.

3. The synthetic board of claim 2 wherein said mixture of reactive hydrogen-containing compounds comprises a member selected from the group consisting of (1) blend (a) and said aromatic polyester polyol (i) comprises a member selected from the group consisting of (a) a mixture prepared by the transesterification, with a glycol of molecular weight from about 60 to 400, of an ester-containing by-product fraction from the manufacture of dimethyl terephthalate, (b) a mixture prepared by the transesterification of polyalkylene terephthalate with a polyol, and (c) mixtures thereof, (2) reaction product (b) and said aromatic coreactant comprises a member selected from the group consisting of (a) an ester-containing by-product fraction from the manufacture of dimethyl terephthalate, (b) polyalkylene terephthalate, and (c) mixtures thereof, and (3) mixtures thereof.

4. The synthetic board of claim 2 wherein said mixture of reactive hydrogen-containing compounds comprises a member selected from the group consisting of (1) blend (a) and said aromatic polyester polyol (i) comprises a member selected from the group consisting of (a) a mixture prepared by the transesterification, with a glycol of molecular weight from about 60 to 400, of a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials, (b) a mixture prepared by the transesterification, with a glycol of molecular weight from about 60 to about 400, of a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids, (c) a mixture prepared by the transesterification of polyalkylene terephthalate with a polyol, and (d) mixtures thereof, (2) reaction product (b) and said aromatic coreactant comprises a member selected from the group consisting of (a) a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials, (b) a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids, (c) polyalkylene terephthalate, and (d) mixtures thereof, and (3) mixtures thereof.

5. The synthetic board of claim 2 wherein said mixture of reactive hydrogen-containing compounds comprises a member selected from the group consisting of (1) a blend of (i) a reaction product of at least one fatty acid and at least one glycol, and (ii) a member selected from the group consisting of (a) a mixture prepared by the transesterification, with a glycol, of an ester-containing by-product from the manufacture of dimethyl terephthalate, (b) a mixture prepared by the transesterification of polyalkylene terephthalate with a glycol, and (c) mixtures thereof, (2) a reaction product of at least one glycol, at least one fatty acid, and a member selected from the group consisting of (a) an ester-containing by-product from the manufacture of dimethyl terephthalate, (b) polyalkylene terephthalate, and (c) mixtures thereof, and (3) mixtures thereof, wherein each of said glycols is the same or different and is a member selected from the group consisting of ethylene glycol, diethylene glycol, dipropylene glycol, tripropylene glycol and mixtures thereof, and said mixture of reactive hydrogen-containing compounds has a hydroxyl number within a range of from about 150 to 200 and an acid number of from about 0.2 to 10.

6. The synthetic board of claim 1 wherein the equivalent ratio of polyisocyanate to polyol is about 10:1 to 2:1.

7. The synthetic board of claim 1 wherein the equivalent ratio of said polymethylene polyphenyl polyisocyanate to said mixture of reactive hydrogen-containing compounds is about 10:1 to 2:1, and said fatty acid comprises about 5 to 95 weight percent of the ingredients used to produce said blend (a), and about 5 to 95 weight percent of the ingredients used to produce said reaction product (b).

8. The synthetic board of claim 1 wherein said mixture of reactive hydrogen-containing compounds has a hydroxyl number of from about 100 to 700 and a functionality of from about 1 to 8.

9. The synthetic board of claim 1 wherein said mixture of reactive hydrogen-containing compounds has a hydroxyl number of from about 100 to 400 and a functionality of from about 1 to 2.

10. The synthetic board of claim 1 wherein the equivalent ratio of polyisocyanate to polyol is about 8:1 to 3:1.

11. The synthetic board of claim 2 wherein the equivalent ratio of said polymethylene polyphenyl polyisocyanate to said mixture of reactive hydrogen-containing compounds is about 8:1 to 3:1.

12. The synthetic board of claim 11 wherein said mixture of reactive hydrogen-containing compounds has a hydroxyl number of from about 100 to 700 and a functionality of from about 1 to 8.

13. The synthetic board of claim 12 wherein said fatty acid comprises about 30 to 70 weight percent of the total ingredients yielding said mixture of reactive hydrogen-containing compounds.

14. The synthetic board of claim 13 wherein said mixture of reactive hydrogen-containing compounds has a hydroxyl number of from about 100 to 400 and a functionality of from about 1 to 2.

15. The synthetic board of claim 3 wherein the equivalent ratio of polyisocyanate to polyol is about 10:1 to 2:1.

16. The synthetic board of claim 15 wherein said mixture of reactive hydrogen-containing compounds has a hydroxyl number of from about 100 to 400 and a functionality of from about 1 to 2.

17. The synthetic board of claim 16 wherein said fatty acid comprises about 30 to 70 weight percent of the total ingredients yielding said mixture of reactive hydrogen-containing compounds.

18. The synthetic board of claim 3 wherein the equivalent ratio of polyisocyanate to polyol is about 8:1 to 3:1.

19. The synthetic board of claim 18 wherein said mixture of reactive hydrogen-containing compounds has a hydroxyl number of from about 100 to 400 and a functionality of from about 1 to 2.

20. The synthetic board of claim 19 wherein said fatty acid comprises about 30 to 70 weight percent of the total ingredients yielding said mixture of reactive hydrogen-containing compounds.

21. The synthetic board of claim 7 wherein said mixture of reactive hydrogen-containing compounds has a hydroxyl number of from about 100 to 700 and a functionality of from about 1 to 8.

22. The synthethic board of claim 7 wherein said mixture of reactive hydrogen-containing compounds has a hydroxyl number of from about 100 to 400 and a functionality of from about 1 to 2.

* * * * *